United States Patent
Choi et al.

(10) Patent No.: US 12,457,411 B2
(45) Date of Patent: Oct. 28, 2025

(54) PLATFORM, IMAGE PROCESSING SYSTEM AND IMAGE PROCESSING SYSTEM OPERATION METHOD FOR CHANGING SETTINGS OF IMAGE SENSOR

(71) Applicant: Samsung Electronics Co., Ltd., Suwon-si (KR)

(72) Inventors: Hyehyun Choi, Suwon-si (KR); Hyeonung Kim, Suwon-si (KR); Sehwa Jang, Suwon-si (KR); Shunghan Cho, Suwon-si (KR); Jaepil Ha, Suwon-si (KR); Gilseong Heo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 91 days.

(21) Appl. No.: 18/436,491

(22) Filed: Feb. 8, 2024

(65) Prior Publication Data

US 2024/0292084 A1    Aug. 29, 2024

(30) Foreign Application Priority Data

Feb. 23, 2023    (KR) .................. 10-2023-0024587

(51) Int. Cl.
*H04N 23/62*    (2023.01)
*G06F 9/30*    (2018.01)
(Continued)

(52) U.S. Cl.
CPC .......... *H04N 23/62* (2023.01); *G06F 9/30181* (2013.01); *G06F 9/547* (2013.01); *H04N 23/617* (2023.01); *H04N 23/57* (2023.01)

(58) Field of Classification Search
CPC ...... H04N 23/57; H04N 23/60; H04N 23/617; H04N 23/62; G06F 9/30181
See application file for complete search history.

(56) References Cited

U.S. PATENT DOCUMENTS 10,432,859 B2    10/2019   Lee
11,265,474 B2    3/2022    Dolgin et al.
(Continued)

FOREIGN PATENT DOCUMENTS

JP    2020-191520 A    11/2020
JP    2021-032835 A    3/2021
(Continued)

*Primary Examiner* — Daniel M Pasiewicz
(74) *Attorney, Agent, or Firm* — Harness, Dickey & Pierce, P.L.C.

(57) ABSTRACT

An image processing system includes a user interface configured to receive first setting data from a user and transmit a setting change command corresponding to the first setting data, a platform configured to hook a first call command into a second call command in response to receiving the setting change command, and a driver configured to transmit, to an image sensor, one of a first operation setting command corresponding to the first call command or a second operation setting command corresponding to the second call command, the second call command associated with changing a setting value of the image sensor, the second operation setting command associated with setting the setting value of the image sensor based on the first setting data. The driver is further configured to, in response to receiving the second call command, transmit the second operation setting command to the image sensor.

20 Claims, 11 Drawing Sheets

(51) Int. Cl.
   *G06F 9/54*       (2006.01)
   *H04N 23/617*     (2023.01)
   *H04N 23/57*      (2023.01)

(56) References Cited

U.S. PATENT DOCUMENTS

| | | | | |
|---|---|---|---|---|
| 2010/0026710 | A1* | 2/2010 | Selvanandan | A63F 13/213 |
| | | | | 715/764 |
| 2013/0343741 | A1 | 12/2013 | Nikam | |
| 2019/0193745 | A1* | 6/2019 | Golov | G05D 1/0088 |
| 2019/0193747 | A1* | 6/2019 | Golov | B60W 50/023 |

FOREIGN PATENT DOCUMENTS

| | | | |
|---|---|---|---|
| KR | 10-1039423 | B1 | 6/2011 |
| KR | 10-2297591 | B1 | 9/2021 |

\* cited by examiner

FIG. 3

| ITEM | ADDRESS | Init | Min | Max |
|---|---|---|---|---|
| PRECONDITION | 4000020E | 0400 | | |
| PRECONDITION | 40000230 | 0020 | | |
| GAIN L_x1.0 | 200282AC | 0100 | 20 | 20 |

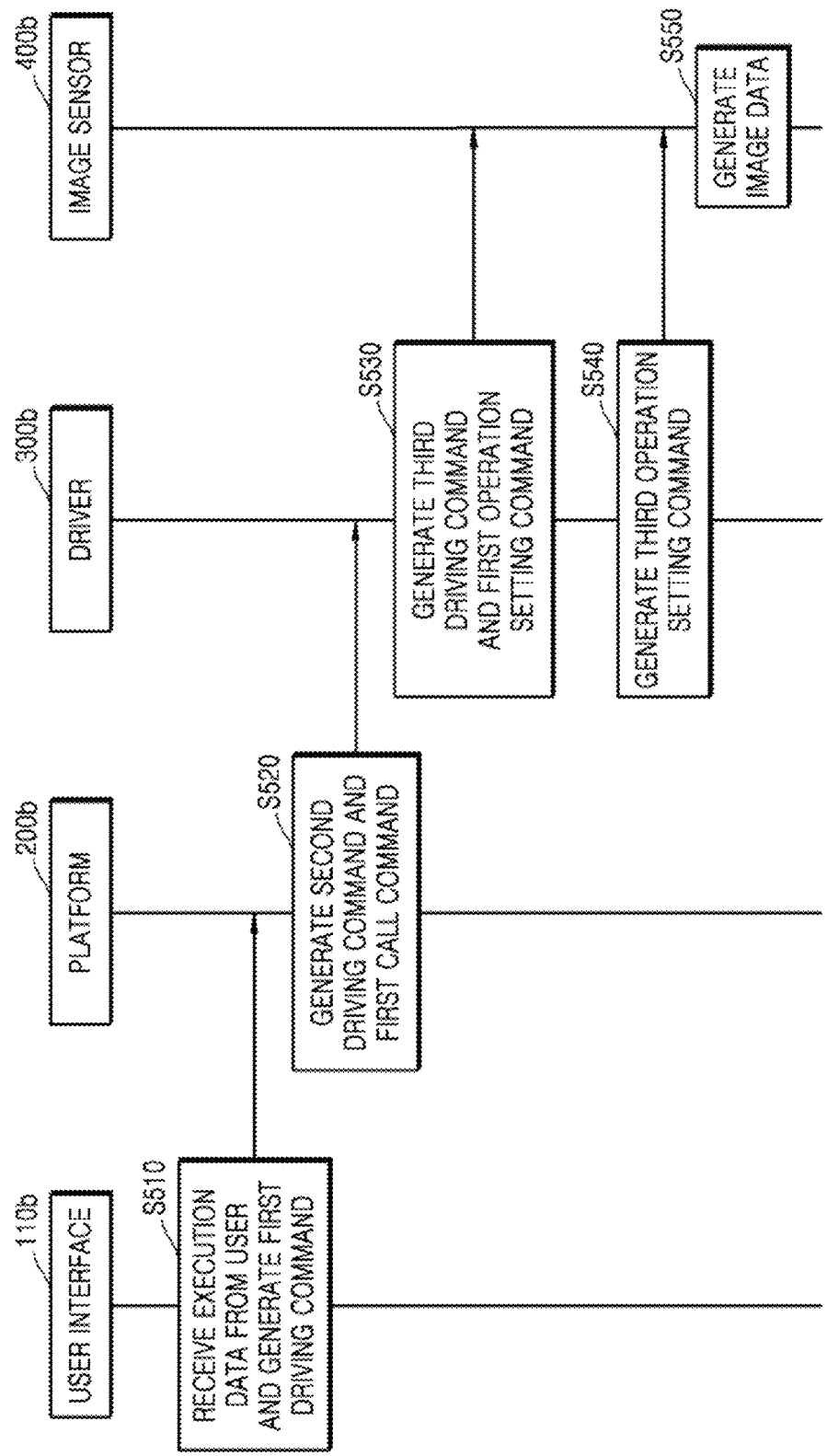

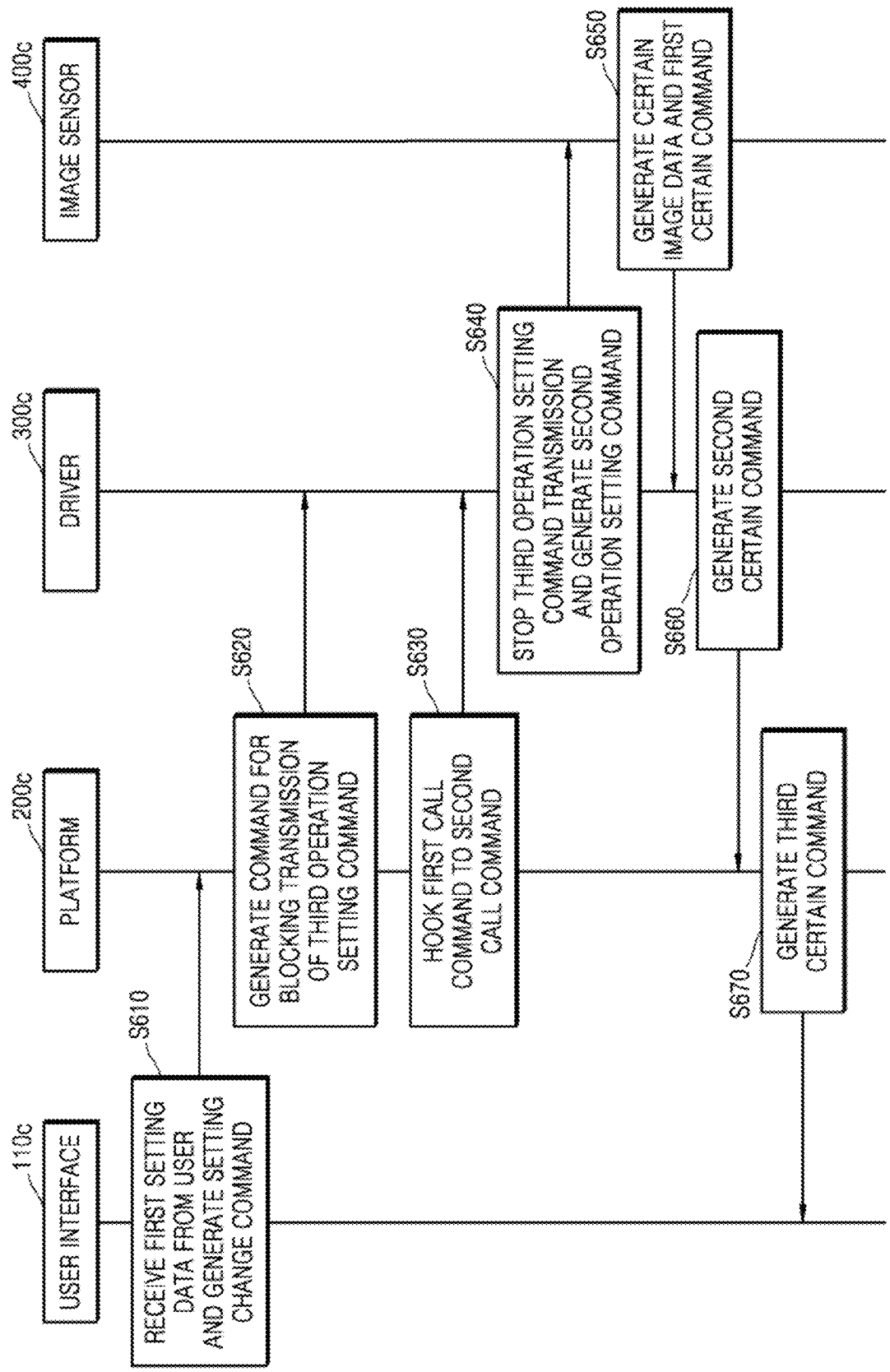

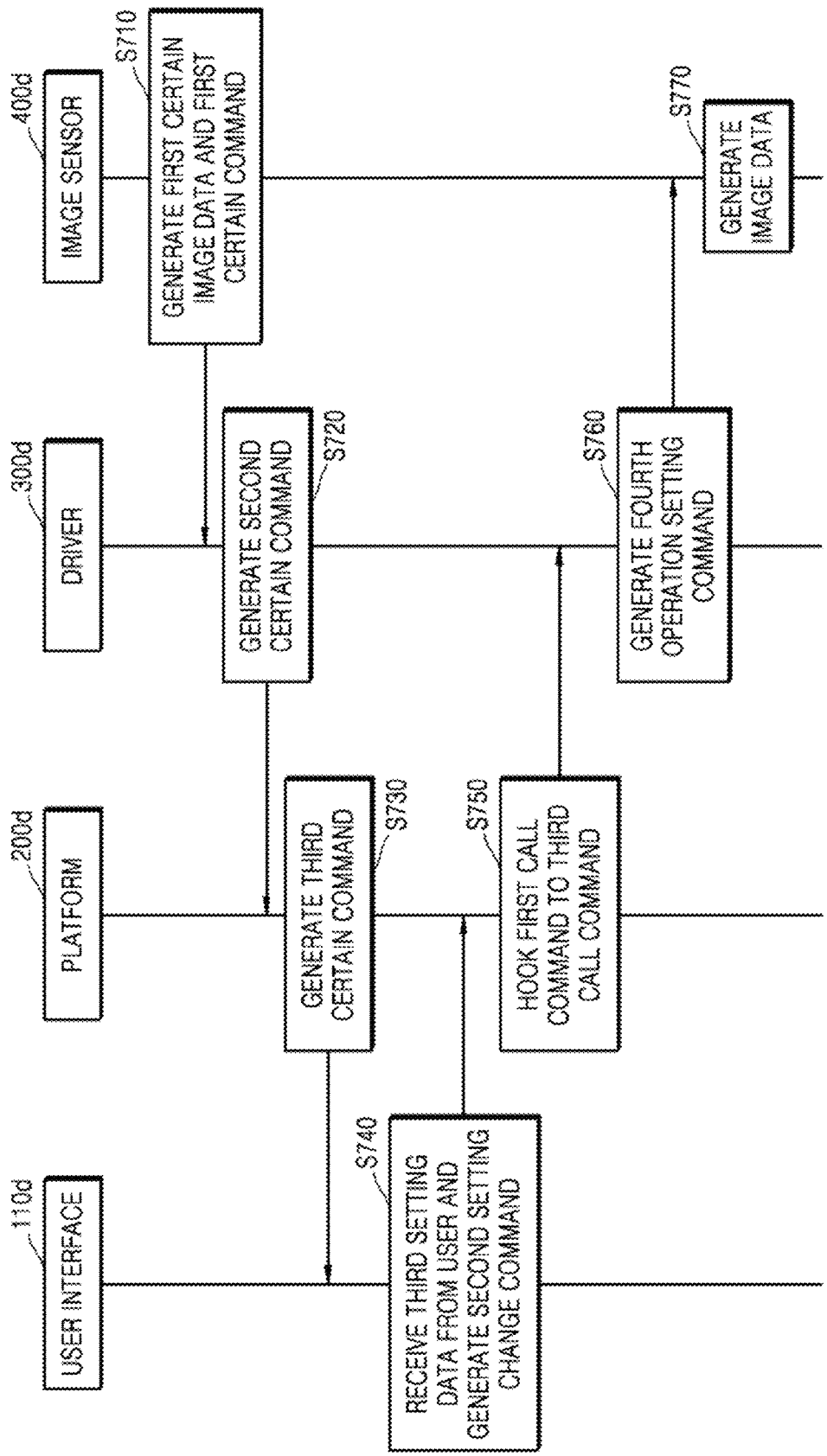

PLATFORM, IMAGE PROCESSING SYSTEM AND IMAGE PROCESSING SYSTEM OPERATION METHOD FOR CHANGING SETTINGS OF IMAGE SENSOR

CROSS-REFERENCE TO RELATED APPLICATION

This application is based on and claims priority under 35 U.S.C. § 119 to Korean Patent Application No. 10-2023-0024587, filed on Feb. 23, 2023, in the Korean Intellectual Property Office, the disclosure of which is incorporated by reference herein in its entirety.

BACKGROUND

The technical idea of the inventive concepts relates to image processing systems, and more particularly, to platforms for changing settings of an image sensor, image processing systems including the same, and operating methods of the image processing systems.

An image sensor is a device that captures a two-dimensional or three-dimensional image of an object. The image sensor generates an image of an object using a photoelectric conversion element that reacts according to the intensity of light reflected from the object. With the recent development of Complementary Metal-Oxide Semiconductor (CMOS) technology, CMOS image sensors using a CMOS are widely used.

In order for the image sensor to operate, various setting values are required and numerous setting values exist for this purpose. Even if the image sensor has the same setting values, the image sensor may produce different results according to the image signal processing (ISP) of the device and may produce different results according to the shooting environment. Therefore, the need to change set values within a short period of time is increasing.

SUMMARY

Some example embodiments of the inventive concepts provide a platform capable of changing the settings of an image sensor within a short time without modifying the initial setting values of the image sensor, an image processing system including the same, and an operating method of the image processing system.

According to some example embodiments of the inventive concepts, an image processing system may include a user interface configured to receive first setting data from a user and transmit a setting change command corresponding to the first setting data, a platform configured to hook a first call command into a second call command in response to receiving the setting change command, and a driver configured to transmit, to an image sensor, one of a first operation setting command corresponding to the first call command or a second operation setting command corresponding to the second call command. The second call command may be associated with changing a setting value of the image sensor. The second operation setting command may be associated with setting the setting value of the image sensor based on the first setting data. The driver may be further configured to, in response to receiving the second call command, transmit the second operation setting command to the image sensor.

According to some example embodiments of the inventive concepts, an operating method of an image processing system including an image sensor may include receiving execution data from a user and setting a setting value of the image sensor as an initial setting value based on a first operation setting command, receiving setting data including a change setting value from the user and generating a setting change command corresponding to the setting data, hooking a first call command associated with calling the first operation setting command to a second call command based on the setting change command, generating a second operation setting command associated with changing the setting value of the image sensor to the change setting value based on the second call command, and changing the setting value of the image sensor to the change setting value based on the second operation setting command.

According to some example embodiments of the inventive concepts, a platform configured to change a setting of an image sensor may include an application programming interface (API) configured to connect a camera application for controlling the image sensor with the platform, and a hardware abstraction layer configured to connect the platform to a driver. The hardware abstraction layer may include a control interface that is configured to generate a first call command associated with calling a command associated with setting a setting value of the image sensor as an initial setting value, generate a second call command associated with calling a command associated with setting the setting value of the image sensor as a change setting value, and receive a setting change command through a user interface included in the camera application and hook the first call command transmitted to the driver to the second call command transmitted to the driver based on the setting change command.

BRIEF DESCRIPTION OF THE DRAWINGS

Example embodiments will be more clearly understood from the following detailed description taken in conjunction with the accompanying drawings in which:

FIG. 3 is a table for describing setting data according to some example embodiments;

FIG. 5 is a flowchart illustrating an implementation example of a method of operating an image processing system, according to some example embodiments;

FIG. 6 is a flowchart illustrating an implementation example of a method of operating an image processing system, according to some example embodiments;

FIG. 7 is a flowchart illustrating an implementation example of a method of operating an image processing system, according to some example embodiments;

DETAILED DESCRIPTION

As described below, some example embodiments are described with reference to the accompanying drawings.

However, it will be understood by one of ordinary skill in the art that the inventive concepts may be implemented as other detailed forms without the technical concept or essential features thereof being changed. Therefore, the example embodiments described below shall be understood as examples rather than definitions, in all aspects.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Figure 1:
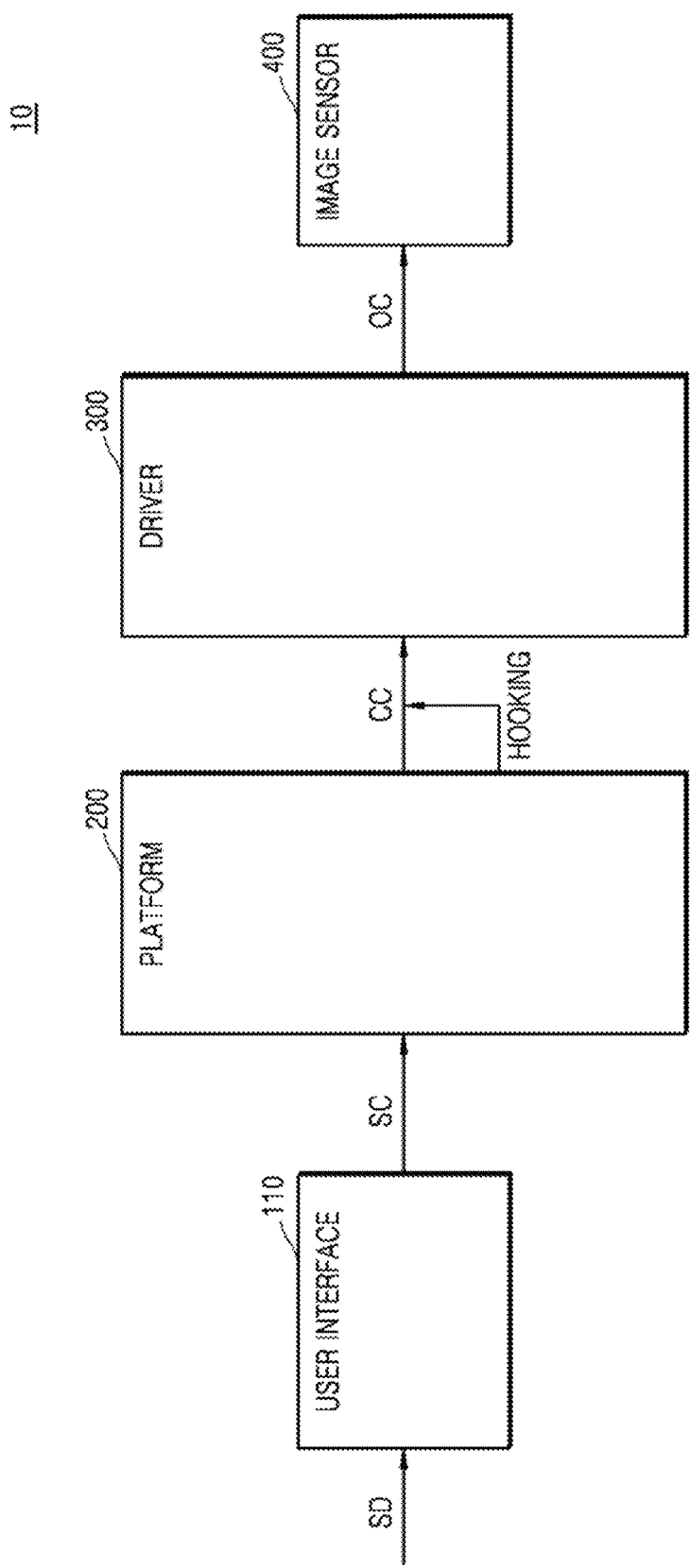
FIG. 1 is a schematic block diagram of an image processing system according to some example embodiments.

FIG. 1 is a schematic block diagram of an image processing system according to some example embodiments.

An image processing system 10 may be embedded in an electronic device or implemented as an electronic device. An electronic device is a device that captures an image, displays the captured image, or performs an operation based on the captured image, and for example, may include electronic devices, such as digital cameras, smartphones, wearable devices, Internet of Things (IoT) devices, personal computers (PCs), tablet PCs, personal digital assistants (PDAs), portable multimedia players (PMPs), navigation devices, drones, and the like, or may be mounted on electronic devices provided as parts of vehicles, medical devices, furniture, manufacturing facilities, security devices, doors, various measuring devices, and the like.

Referring to FIG. 1, an image processing system 10 may include a user interface 110, a platform 200, a driver 300, and an image sensor 400. The user interface 110 may be implemented with various devices capable of receiving a user's input (hereinafter, referred to as 'user input'), such as a keyboard, a curtain key panel, a touch panel, a fingerprint sensor, and/or a microphone. The user interface 110 may receive a user input and provide a command corresponding to the received user input to the platform 200. In some example embodiments, the user interface 110 may receive first setting data SD from a user and transmit a setting change command SC corresponding to the first setting data SD to the platform 200. The first setting data SD and the setting change command SC may include change setting values for changing the setting values of the image sensor 400, and some example embodiments of this are described below with reference to FIG. 3. In some example embodiments, the image sensor 400 may have one or more settings (e.g., one or more operating settings, one or more operating properties, one or more operating parameters, etc.). In some example embodiments, the image sensor 400 may be configured to operate (e.g., to generate one or more pieces of image data, also referred to herein as one or more images) according to one or more setting values (e.g., one or more values of one or more settings), also referred to interchangeably as operating parameter values, operating property values, or the like, including for example an exposure time of the image sensor 400 (e.g., a period of time that one or more pixels of the image sensor 400 is operated to absorb incident light to generate image data), a sensitivity of the image sensor 400, or the like. In some example embodiments, the image sensor 400 may be configured to change image data generated by the image sensor 400 based on changing one or more setting values of the image sensor 400, thereby configuring the image sensor 400 to change the operational parameters according to which the image sensor 400 generates one or more pieces of image data based on receiving incident light from an external environment. As a result of generating image data based on changed one or more setting values, the image sensor 400 may provide image data having improved image quality (e.g., reduced or omitted noise in the image data).

The platform 200 may be a hardware architecture or a software framework that drives the driver 300 by receiving a command from an application. The platform 200 may be a part of an Operating System (OS). In some example embodiments, the platform 200 may transmit a call command CC to the driver 300 to drive the driver 300 and hook a call command CC based on the setting change command SC received from the user interface 110. Hooking may refer to an act of changing or intercepting a function call, message, event, and the like occurring between software components in a computer program in the middle (e.g., during the middle of the transmission of the function call, message, event, and the like between the software components). For example, the platform 200 may transmit a first call command to the driver 300. The platform 200 may receive a setting change command SC from the user interface 110 and hook the first call command as a second call command (e.g., hook the first call command into the second call command and/or hook the first call command to the second call command, which may include changing or intercepting the first call command during the transmission of the first call command from the platform 200 to the driver 300) based on the setting change command SC (e.g., in response to receiving the setting change command SC). When the platform 200 hooks the first call command into the second call command, the driver 300 may receive the second call command instead of the first call command. The second call command may be generated based on the setting change command SC and may include a change setting value.

The driver 300 may be a program that operates as a part of a kernel or the entire kernel for controlling certain hardware or devices. In some example embodiments, the driver 300 may be a program that receives a command from the platform 200 and drives the image sensor 400. For example, the driver 300 may receive a call command CC from the platform 200 and transmit an operation setting command OC, which is a command for setting or changing a setting value of the image sensor 400, to the image sensor 400 based on (e.g., corresponding to) the call command CC.

In some example embodiments, the driver 300 may store an initial setting value of the image sensor 400. For example, the driver 300 may include pieces of register code (also referred to herein interchangeably as a plurality of register codes, as register codes, or the like), and the register codes (e.g., the plurality of register codes) may include initial setting values of the image sensor 400. An initial setting value may include information indicating the exposure time of the image sensor 400 or the sensitivity of the image sensor 400.

In some example embodiments, when (e.g., in response to) receiving a first call command from the platform 200, the driver 300 may transmit, to the image sensor 400, a first operation setting command generated based on pieces of register code (and when (e.g., in response to) receiving the second call command, the driver 300 may transmit, to the image sensor 400, a second operation setting command generated based on a second call command including a change setting value. For example, the operation setting command OC may include a first operation setting command corresponding to the first call command or a second operation setting command corresponding to the second call command.

The image sensor 400 may convert a subject's optical signal incident through an optical lens (e.g., photoelectrically convert incident light that is incident on the image sensor 400 from a subject in an external environment) into an electrical signal and generate an image based on the electrical signal. The image sensor 400 may correct an electrical signal and output (e.g., generate, transmit, etc.) corrected image data. The image sensor 400 may be implemented as a Complementary Metal-Oxide Semiconductor (CMOS) image sensor. The image sensor 400 may adjustably control (e.g., correct) the electrical signal and output the corrected image data based on one or more setting values of the image sensor 400. The image sensor 400 may set or change a setting value of the image sensor 400, and thus adjustably control the image data that is transmitted by the image sensor 400 based on receiving incident light from the external environment, based on the operation setting command OC received from the driver 300. Such changing may result in reducing or removing noise in the image data. As a result, based on the image sensor 400 setting or changing the setting value, the image sensor 400 may generate image data having reduced or removed noise, such that the image sensor 400 may have improved functionality at least by virtue of providing improved-quality image data (e.g., images having improved image quality).

In some example embodiments, when the image sensor 400 receives a first operation setting command from the driver 300, the image sensor 400 may, in response, set a setting value of the image sensor 400 as an initial setting value. For example, the first operation setting command may be generated based on the register code and may include an initial setting value. The initial setting value may include the exposure time of the image sensor 400. When receiving the first operation setting command, the image sensor 400 may, in response, set the exposure time of the image sensor 400 based on the first operation setting command.

In some example embodiments, when the image sensor 400 receives a second operation setting command from the driver 300, the image sensor 400 may, in response, change a setting value of the image sensor 400 to a change setting value. For example, the second operation setting command may be generated based on the second call command including the change setting value, and the change setting value may include the changed exposure time of the image sensor 400 set by the user, which may be indicated by the first setting data SD. When receiving the second operation setting command, the image sensor 400 may change the exposure time of the image sensor 400 to the changed exposure time based on the second operation setting command, and thus based on the first setting data SD.

The image processing system 10 may receive first setting data SD including a change setting value of the image sensor 400 from a user and may hook a first call command into a second call command. The first call command may call a first operation setting command including an initial setting value. The second call command may call a second operation setting command including a change setting value. In some example embodiments, hooking the first call command into the second call command may include hooking the first call command such that the platform changes or intercepts the first call command during the transmission of the first call command from the platform 200 to the driver 300. By hooking the first call command to the second call command, the image processing system 10 does not modify the register code, and a setting value of the image sensor 400 may be changed according to setting data input by a user. Accordingly, the time required to change the setting value of the image sensor 400 may be reduced. As a result, the responsiveness of the image sensor 400 to user-specified changes in setting values may be improved, and thus the image sensor 400 may be configured to generate image data based on the user-input first setting data (and the changed setting value(s) indicated thereby) more quickly, thereby improving the functionality of the image sensor 400 and an image processing system 10 including same by virtue of improving the ability thereof to quickly adapt to user-specified changes in setting values and thus to quickly provide image data that is based on such changes in setting values.

Figure 2:
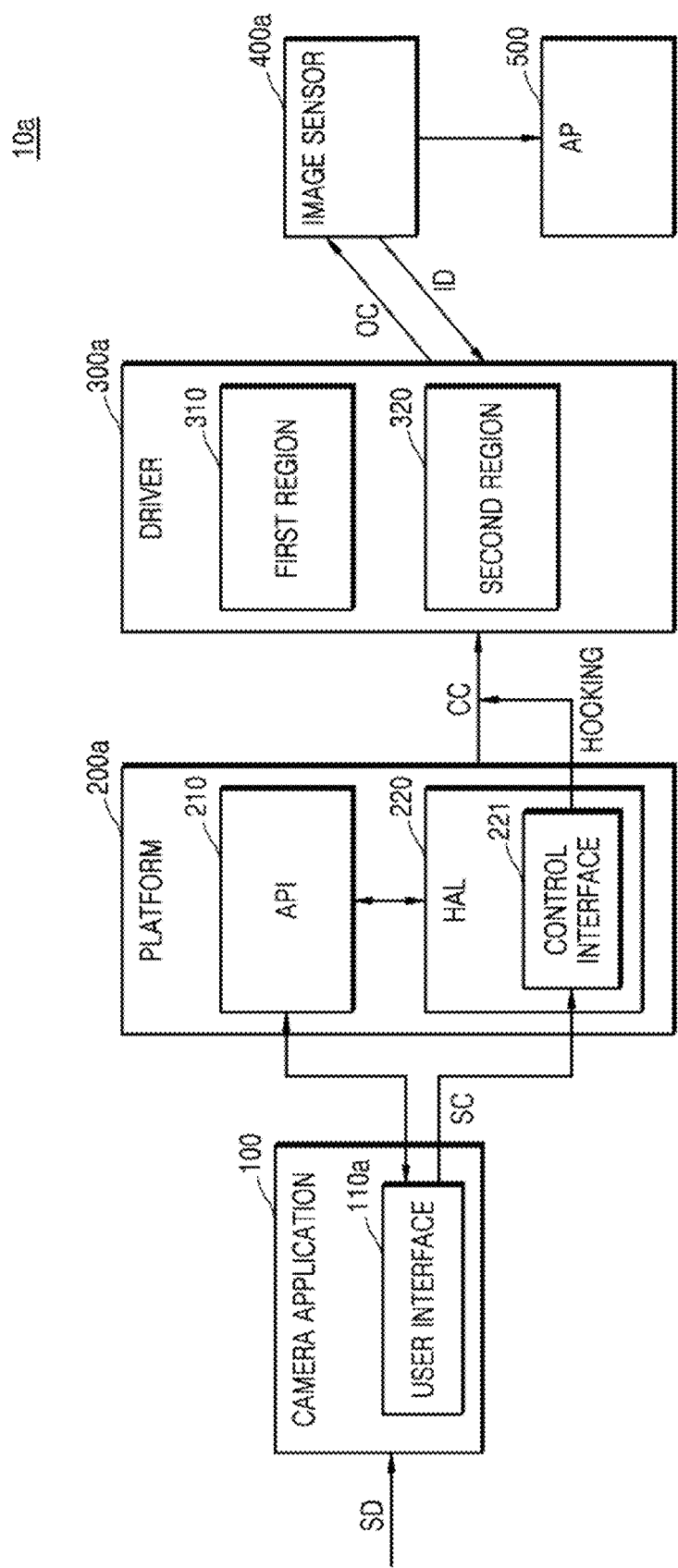
FIG. 2 is a block diagram illustrating an implementation example of an image processing system according to some example embodiments.

FIG. 2 is a block diagram illustrating an implementation example of an image processing system according to some example embodiments. In some example embodiments, an image processing system 10a of FIG. 2 may be an example of the image processing system 10 of FIG. 1.

Referring to FIG. 2, the image processing system 10a may include a camera application 100, a platform 200a, a driver 300a, an image sensor 400a, and an application processor 500.

The camera application 100 may refer to software executed in an OS for controlling settings of the image sensor 400a. The camera application 100 may include a user interface 110a. The user interface 110a may be an example of the user interface 110 of FIG. 1, and descriptions as those of FIG. 1 are omitted. In some example embodiments, the user interface 110a may receive setting data SD from a user and transmit a setting change command SC corresponding to the setting data SD to a control interface 221. The setting data SD may include first setting data including a change setting value for changing the setting value of the image sensor 400a, and the first setting change command corresponding to the first setting data may include a change setting value. Some example embodiments of this are described below with reference to FIG. 3. The setting data SD may include third setting data including a user change setting value generated based on second setting data including a certain change value. The user interface 110a may transmit a second change command corresponding to the third setting data, and the second setting change command corresponding to the third setting data may include a user change setting value. Some example embodiments of this are described below with reference to FIG. 7. In some example embodiments, the user interface 110a may transmit a command for driving the image sensor 400a to an application programming interface (API) 210 in response to a user's input. For example, the user interface 110a may transmit a camera on command (e.g., a command to turn on, or activate, the image sensor 400a) to the API 210.

The platform 200a may be an example of the platform 200 of FIG. 1, and a description as that of FIG. 1 is omitted. The platform 200a may include an API 210 and a Hardware Abstraction Layer (HAL) 220.

The API 210 may refer to a connection between devices or device programs and may provide services to other types of software as a software interface. In some example embodiments, the API 210 may be configured to connect the camera application 100 to the platform 200a. For example, the API 210 may receive a camera on command from the user interface 110a included in the camera application 100 and transmit the received camera on command to the HAL 220.

The HAL 220 may be an abstraction layer between the physical hardware of a device and the software running on the device, and the abstraction layer may refer to a set of software enabling access to hardware resources through a programming interface. In some example embodiments, the HAL 220 may be configured to connect the platform 200a to the driver 300a. For example, the HAL 220 may receive a camera on command from the API 210 and transmit the received camera on command to the driver 300a. In some example embodiments, the HAL 220 may transmit a call command CC to the driver 300a. For example, the call command CC may include a first call command or a second call command. The second call command may be generated based on the first setting change command and may include a change setting value.

The HAL 220 may include a control interface 221, and the control interface 221 may hook a call command CC. In some example embodiments, a setting change command SC may be received from the user interface 110a, and a call command CC may be hooked based on the received setting change command SC. The control interface 221 may be configured to receive the setting change command SC from the user interface 110a and may be configured to hook a call command CC (e.g., hook a first call command to a second call command as described herein), for example based on the received setting change command. For example, the control interface 221 may hook a first call command to a second call command based on the first setting change command, and the driver 300a may receive the second call command instead of the first call command.

In some example embodiments, the control interface 221 may monitor the call command (e.g., monitor a first call command being transmitted by the platform 200a to the driver 300a) and may hook the first call command to the second call command in real time (e.g., while the first call command being monitored is still in the process of being transmitted, such that the hooking is performed before the first call command transmission is completed), for example performing the hooking based on a setting change command SC received at the control interface 221 from the user interface 110a. For example, the control interface 221 may monitor the first call command, and when receiving a setting change command SC from the user interface 110a (e.g., in response to receiving the setting change command SC), the control interface 221 may hook the first call command into the second call command in real time (e.g., while the first call command being monitored is still being transmitted, such that the hooking is performed without waiting for another subsequent call command transmission and/or without initiating a separate call command subsequent to the first call command transmission being completed). Accordingly, when it is necessary to change the setting of the image sensor 400a, the image processing system 10a does not modify the register code (for example, without creating and downloading new firmware/an image after building the register code), and may change the setting value of the image sensor 400a according to the setting data input by the user, so that the time required to change the setting value of the image sensor 400a may be reduced, thereby improving the responsiveness (e.g., operating speed) of the image sensor 400a and/or image processing system 10a with regard to changing settings of the image sensor 400a (e.g., setting values), thereby improving the functionality of the image sensor 400a and/or image processing system 10a including same to provide changed image data generated by the image sensor 400a (which may have improved image quality based on a changed setting value) more quickly.

The driver 300a may be an example of the driver 300 of FIG. 1, and a description as that of FIG. 1 is omitted. The driver 300a may include a first region 310 and a second region 320.

The first region 310 may store pieces of register code, also referred to interchangeably herein as a plurality of register codes, as simply register codes, or the like. The register code may be in the form of source code and may be referred to as a program or firmware. In some example embodiments, the register code (e.g., at least one register code of the plurality of register codes) may include an initial setting value of the image sensor 400a. For example, the register code (e.g., at least one register code of the plurality of register codes) may include the exposure time of the image sensor 400a or the sensitivity of the image sensor 400a.

The second region 320 may store at least one piece of control code (e.g., at least one control code). In some example embodiments, the control code (e.g., the at least one control code) may include a driving setting value of the image sensor 400a. For example, the control code may be generated based on a piece of register code (e.g., based on one or more register codes, based on the plurality of register codes, or the like) and may include a first driving setting value for driving the setting value of the image sensor 400a as an initial setting value. The control code may be generated based on a second call command including a change setting value and may include a second driving setting value for driving the setting value of the image sensor 400a to the change setting value.

The driver 300a may transmit an operation setting command OC to the image sensor 400a based on the call command CC. In some example embodiments, when the driver 300a receives the first call command, the driver 300a may read the first region 310 and generate at least one control code based on pieces of register code (e.g., one or more register codes of the plurality of register codes) that are stored in the first region 310 and are read by the driver 300a. The generated control code may include a first driving setting value and may be stored in the second region 320. The driver 300a may generate a first operation setting command based on the first driving setting value and transmit the generated first operation setting command to the image sensor 400a to cause the image sensor to set the setting value of the image sensor 400a to a particular setting value (e.g., an initial setting value).

In some example embodiments, when the driver 300a receives the second call command, the driver 300a may, in response, generate at least one control code based on a change setting value included in the second call command. The generated control code may include a second driving setting value and may be stored in the second region 320. The driver 300a may generate a second operation setting command based on the second driving setting value and transmit the generated second operation setting command to the image sensor 400a to cause the image sensor to set the setting value of the image sensor 400a to a particular setting value (e.g., the change setting value).

The image sensor 400a may be an example of the image sensor 400 of FIG. 1, and descriptions as those of FIG. 1 are omitted. The image sensor 400a may set or change a setting value of the image sensor 400a based on the operation setting command OC received from the driver 300a and may generate pieces of image data IDs based on the changed setting value of the image sensor 400a. In some example embodiments, the image sensor 400a may generate pieces of image data IDs after changing a setting value of the image sensor 400a and convert (e.g., transmit) the pieces of image data IDs to the driver 300a. Some example embodiments of this are described below with reference to FIG. 6.

The application processor 500 (hereinafter referred to as an AP) may control the image processing system 10a. In some example embodiments, the AP 500 may receive pieces of image data IDs and change setting values from the image sensor 400*a* and may generate a certain change value using an arithmetic algorithm based on pieces of image data IDs. Some example embodiments of this are described below with reference to FIG. 6.

FIG. 3 is a table for describing setting data according to some example embodiments.

Referring to FIGS. 2 and 3, in some example embodiments, the first setting data may include a change setting value for changing a setting value of the image sensor 400*a*. The change setting value may be a setting value corresponding to at least one register code of the plurality of register codes stored in the first region 310. Each of the plurality of register codes stored in the first region 310 (e.g., each register code of the plurality of register codes) may include an address and a key value. A group of register codes including some or all of pieces of register code (e.g., some or all register codes of the plurality of register codes, at least one register code of the plurality of register codes, a first register code of the plurality of register codes, or the like) may be referred to as a register code group. The change setting value may include an address of the register code group, a change value or change values corresponding to a key value of the register code group, and a range of the change value or a range of the change values. The change value or the change values may include an initial value Init, a minimum value Min, and a maximum value Max, and the range of the change value or the range of the change values may be calculated from a value obtained by subtracting the minimum value Min from the initial value Init to a value obtained by adding the maximum value Max to the initial value Init. The item ITEM may be a name corresponding to an address of a register code group. For example, the table of FIG. 3 may be a table showing some of the change setting values. The register code of which an address is 200282AC may have a name ITEM of Gain L_xl.0. The initial value Init may be 0100, the minimum value Min may be 20, the maximum value Max may be 20, and the range of change values of the register code having an address of 200282AC may be 0080 to 0120.

In some example embodiments, the first setting data may include various change setting values and is not limited to the table of FIG. 3. For example, the first setting data may include a change setting value for a certain register code. The change setting value for the certain register code may include the address of the certain register code and a change value corresponding to the key value of the certain register code. The certain register code may be part of pieces of register code or may refer to all of the plurality of register codes. When the first setting data includes a change setting value for a certain register code, since the user may change the setting value of the image sensor 400*a* based on the change setting value for the designated register code, a user may arbitrarily change the setting value of the image sensor 400*a* and may change setting values respectively corresponding to all register codes.

Figure 4:
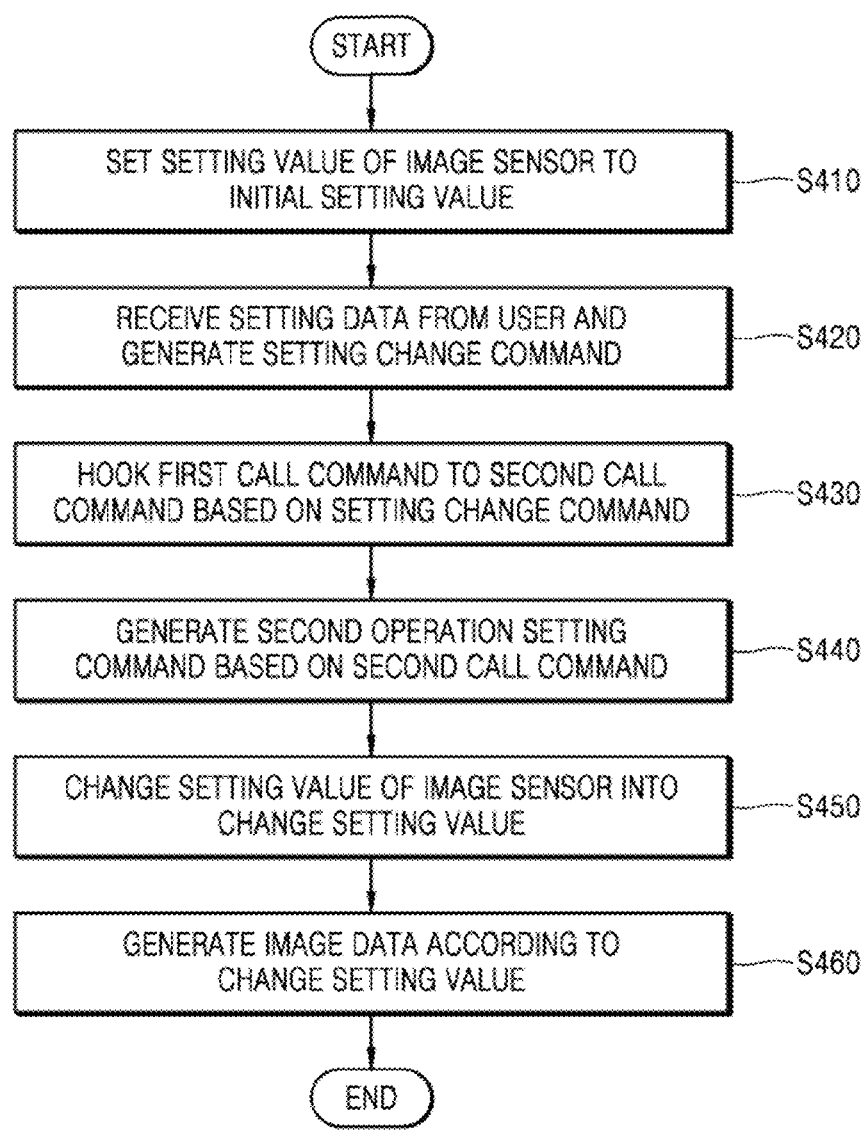
FIG. 4 is a flowchart illustrating an operating method of an image processing system, according to some example embodiments.

FIG. 4 is a flowchart illustrating an operating method of an image processing system (e.g., an operating method performed by an image processing system according to any of the example embodiments), according to some example embodiments. As shown in FIG. 4, the method of operating the image processing system may include operations S410 to S450.

Further referring to FIGS. 2 and 3, in operation S410, the image processing system 10*a* may set a setting value of the image sensor 400*a* as an initial setting value. Some example embodiments of this are described below with reference to FIG. 5.

In operation S420, the image processing system 10*a* may receive setting data from the user and generate a setting change command (also referred to herein as a first setting change command). In some example embodiments, the user interface 110*a* may receive first setting data including a change setting value for changing the setting value of the image sensor 400*a* from the user and may generate a first setting change command corresponding to the first setting data. The first setting change command may include a change setting value. The user interface 110*a* may transmit a first setting change command to the control interface 221.

In operation S430, the image processing system 10*a* may hook the first call command to the second call command based on the setting change command. In some example embodiments, the control interface 221 may hook a first call command to a second call command based on the first setting change command, and the driver 300*a* may receive the second call command instead of the first call command.

In operation S440, the image processing system 10*a* may generate a second operation setting command based on the second call command. In some example embodiments, the driver 300*a* may generate at least one control code based on a change setting value included in the second call command. The generated control code may include a second driving setting value for driving the setting value of the image sensor 400*a* to a change setting value and may be stored in the second region 320. The driver 300*a* may generate a second operation setting command based on the second driving setting value and transmit the generated second operation setting command to the image sensor 400*a*. Accordingly, the second operation setting command may be generated based on at least one control code that may be stored in the second region included in the driver 300*a*.

In operation S450, the image processing system 10*a* may change the setting value of the image sensor 400*a* to a change setting value (e.g., based on the second operation setting command). In some example embodiments, the change setting value may include a changed exposure time of the image sensor 400*a* set by a user, and the image sensor 400*a* may change the exposure time of the image sensor 400*a* to the changed exposure time based on the second operation setting command. As a result, in some example embodiments, the hooking of the first call command to the second call command in operation S430 may be referred to as the control interface 221, in response to receiving the setting change command generated in operation S420, transmitting, to the driver 300*a*, a command to prevent setting the setting value of the image sensor 400*a* to the initial setting value (such command may be the second call command).

In operation S460, the image sensor 400*a* generates one or more pieces of image data (e.g., based on absorbing and photoelectrically converting incident light) according to the change setting value. As a result, the image sensor 400*a* may provide image data that is different from image data generated according to an initial setting value. The image data generated according to the change setting value may have improved image quality (e.g., reduced or no noise). As a result, an image sensor 400*a* that generates one or more pieces of image data according to the change setting value may provide improved image data generation functionality.

FIG. 5 is a flowchart illustrating an implementation example of a method of operating an image processing system, according to some example embodiments. As shown in FIG. 5, the method of operating the image processing system may include operations S510 to S540. With further reference to FIG. 2, in some example embodiments, a user interface 110b, a platform 200b, a driver 300b and an image sensor 400b of FIG. 5 may be the same as the user interface 110a, the platform 200a, the driver 300a and the image sensor 400a of FIG. 2, and descriptions as those of FIG. 2 are omitted.

Further referring to FIG. 4, operations S510 to S540 may be examples of operation S410 of FIG. 4. In operation S510, the user interface 110b may receive execution data from the user and generate a first driving command. In some example embodiments, the execution data may be data for starting an operation of the image processing system 10a, and the first driving command is a command corresponding to execution data and may include a camera on command. The camera on command may include a setting value for starting an operation of the image sensor 400a (e.g., a command to active the image sensor 400b). For example, the user interface 110b may receive execution data and generate a first driving command corresponding to the execution data. The user interface 110b may transmit the first driving command to an API included in the platform 200b.

In operation S520, the platform 200b may generate a second driving command and a first call command based on the first driving command. In some example embodiments, upon receiving the first driving command, the API may transmit a camera on command to the HAL included in the platform 200b based on the first driving command, and the HAL included in the platform 200b may generate a second driving command and a first call command based on the camera on command and transmit them (the second driving command and the first call command) to the driver 300b. The second driving command may include a camera on command.

In operation S530, the driver 300b may generate a third driving command and a first operation setting command. In some example embodiments, the driver 300b may generate a third driving command including a camera on command based on the second driving command and transmit the third driving command to the image sensor 400b. In some example embodiments, the driver 300b may generate a first operation setting command based on the first call command and transmit the generated first operation setting command to the image sensor 400b. For example, the driver 300b may read the first region included in the driver 300b and generate at least one control code based on pieces of register code stored in the first region of the driver 300b. The generated control code may include a first driving setting value for driving the setting value of the image sensor 400b as an initial setting value and may generate a first operation setting command based on the first driving setting value. Accordingly, the first operation setting command may be generated based on at least one control code that may be stored in the second region included in the driver 300b.

In operation S540, the driver 300b may generate a third operation setting command. In some example embodiments, the driver 300b may include register codes that include environment setting values. When there is a change in the external environment (e.g., in response to a determination that a change in the external environment external to and/or within the field of view of the image sensor 400b has occurred, for example based on processing image data ID generated by the image sensor 400b and transmitted to the driver 300b), the driver 300b may generate at least one control code based on register codes respectively including environment setting values corresponding to the external environment. The generated control code may include a third driving setting value for driving the setting value of the image sensor 400b as an environment setting value and may generate a third operation setting command based on the third driving setting value. The external environment change may include at least one of a change in illuminance (e.g., a change in an illuminance of an exterior environment sensed by the image sensor 400b) or a change in a subject in the external environment that may be within a field of view of the image sensor 400b (e.g., a change in a subject that is imaged in image data ID generated by the image sensor 400b).

In operation S550, the image sensor 400b may generate one or more pieces of image data ID (e.g., generate one or more images) based on the initial setting value and/or the environment sensing value (e.g., based on the first operation setting command and/or the third operation setting command).

FIG. 6 is a flowchart illustrating an implementation example of a method of operating an image processing system, according to some example embodiments. As shown in FIG. 6, the method of operating the image processing system may include operations S610 to S670. With further reference to FIG. 2, in some example embodiments, a user interface 110c, a platform 200c, a driver 300c and an image sensor 400c of FIG. 6 may be respectively the same as the user interface 110a, platform 200a, the driver 300a and the image sensor 400a of FIG. 2, and descriptions as those of FIG. 2 are omitted. Further referring to FIG. 4, operation S610 may be the same as operation S420 of FIG. 4 and operation S630 may be the same as operation S430 of FIG. 4. Descriptions as those of FIG. 4 are omitted.

In operation S610, the user interface 110c may receive first setting data from a user and may generate a setting change command corresponding to the first setting data, as described with reference to operation S420 of FIG. 4.

In operation S620, the platform 200c may generate a command to block transmission of the third operation setting command. With further reference to FIG. 5, in some example embodiments, when the first setting data is received from the user after the external environment changes (e.g., after a change in the external environment is determined to have occurred), to change the setting value of the image sensor 400c to the change setting value included in the first setting data, the HAL included in the platform 200c may generate a command to block transmission of the third operation setting command.

In operation S630, the platform 200c may hook the first call command to the second call command based on the setting change command, as described with reference to operation S430 of FIG. 4. In some example embodiments, one or more of operations S620 and/or S630 may include hooking a third call command associated with calling the third operation setting command to the second call command.

In operation S640, the driver 300c may stop transmitting the third operation setting command and generate a second operation setting command. In some example embodiments, the driver 300c may not transmit the third operation setting command to the image sensor 400c (e.g., may stop transmitting the third operation setting command, may refrain from transmitting the third operation setting command, etc.) based on the command to block (e.g., stop, prevent, etc.) transmission of the third operation setting command, and the image sensor 400c may not change a setting value to an environment setting value. An operation of generating the second operation setting command by the driver 300c may be the same as operation S440 of FIG. 4, and a description as that of FIG. 4 is omitted.

In operation S650, the image sensor 400c may generate certain image data (e.g., based on absorbing and photoelectrically converting incident light) and a first certain command. In some example embodiments, the image sensor 400c may generate pieces of image data after changing a setting value of the image sensor 400c and thus may generate pieces of image data based on the change setting value of the image sensor 400c. The AP 500 of FIG. 2 may receive pieces of image data and change setting values from the image sensor 400c and may generate a certain change value using an arithmetic algorithm based on the pieces of image data. The arithmetic algorithm may refer to an algorithm capable of confirming that the image generated by the image sensor 400c is improved. For example, the arithmetic algorithm may be an algorithm that applies addition, subtraction, or multiplication operations to the pieces of image date. However the arithmetic algorithm is not limited to this, and may refer to various algorithms that can confirm that the image generated by the image sensor 400c is improved. The certain change value may refer to a setting value of the image sensor 400c that generates improved image data using an arithmetic algorithm among pieces of image data. The certain change value may be a certain change value among the range of change value or the range of change values of the change setting value corresponding to a register code group as described herein with reference to FIG. 3. Image data generated after the setting value of the image sensor 400c is changed to a certain change value may be referred to as certain image data. For example, when the setting value of the image sensor 400c is set as an initial setting value, image data generated by the image sensor 400c may include noise. When the setting value of the image sensor 400c is set to the change setting value, certain image data among image data generated by the image sensor 400c may not include noise or may have reduced noise relative to image data generated when the setting value of the image sensor 400c is set as an initial setting value. A setting value of the image sensor 400c generating certain image data may be included in the certain change value. The image sensor 400c may receive a certain change value from the AP 500 of FIG. 2 and generate a first certain command including the certain change value.

In operation S660, the driver 300c may generate a second certain command. In some example embodiments, the driver 300c may receive a first certain command from the image sensor 400c and generate a second certain command including a certain change value based on the first certain command.

In operation S670, the platform 200c may generate a third certain command. In some example embodiments, the platform 200c may receive a second certain command from the driver 300c and generate a third certain command including a certain change value based on the second certain command.

FIG. 7 is a flowchart illustrating an implementation example of a method of operating an image processing system, according to some example embodiments. As shown in FIG. 7, the method of operating the image processing system may include operations S710 to S760. With further reference to FIG. 2, in some example embodiments, a user interface 110d, a platform 200d, a driver 300d and an image sensor 400d of FIG. 7 may be respectively the same as the user interface 110a, the platform 200a, the driver 300a and the image sensor 400a of FIG. 2, and descriptions as those of FIG. 2 are omitted. Further referring to FIG. 6, operations S710, S720, and S730 may be the same as operations S650, S660, and S670 of FIG. 6, respectively, and descriptions as those of FIG. 6 are omitted.

In operation S740, the user interface 110d may receive third setting data from the user and generate a second setting change command. In some example embodiments, the user interface 110d may receive a third certain command from the platform 200d and generate second setting data including a certain change value based on the third certain command. The user interface 110d may transmit second setting data (e.g., the second setting data generated based on the third certain command) to the user. The user may generate third setting data based on the second setting data. For example, the user may adjust the generated certain change value using an arithmetic algorithm and generate third setting data including the adjusted certain change value (also referred to herein as an adjusted change value).

In some example embodiments, the user interface 110d may receive third setting data including an adjusted certain change value and generate a second setting change command corresponding to the third setting data. The second setting change command may include a user change setting value including an adjusted certain change value. The user interface 110d may transmit a second setting change command to the platform 200d.

In operation S750, the platform 200d may hook the first call command into a third call command. In some example embodiments, the platform 200d may hook the first call command to the third call command based on the second setting change command, and the driver 300d may receive a third call command instead of the first call command.

In operation S760, the driver 300d may generate a fourth operation setting command based on the third call command. In some example embodiments, the driver 300d may generate at least one control code based on the adjusted change value included in the third call command. The generated control code may include a third driving setting value for driving the setting value of the image sensor 400d to an adjusted change value and may be stored in a second region included in the driver 300d. The driver 300d may generate a fourth operation setting command based on the second driving setting value and transmit the generated fourth operation setting command to the image sensor 400d.

In operation S770, the image sensor 400d may generate one or more pieces of image data ID (e.g., generate one or more images) based on the fourth operation setting command.

Referring to FIGS. 6 and 7, since the setting value of the image sensor 400c or 400d is automatically changed to the change setting value included in the first setting data using an arithmetic algorithm, the user does not have to change each setting value and accordingly, human resources may be saved. Also, since a certain change value is generated using an arithmetic algorithm and the setting value of the image sensor 400c or 400d is changed with a certain change value adjusted by the user based on the certain change value, customization for each user may be possible. As a result, an image sensor and/or an image processing system including same may have improved functionality by virtue of having improved capability of adjusting one or more setting values, for example to provide customized image data that is customized according to certain user inputs.

Figure 8A:
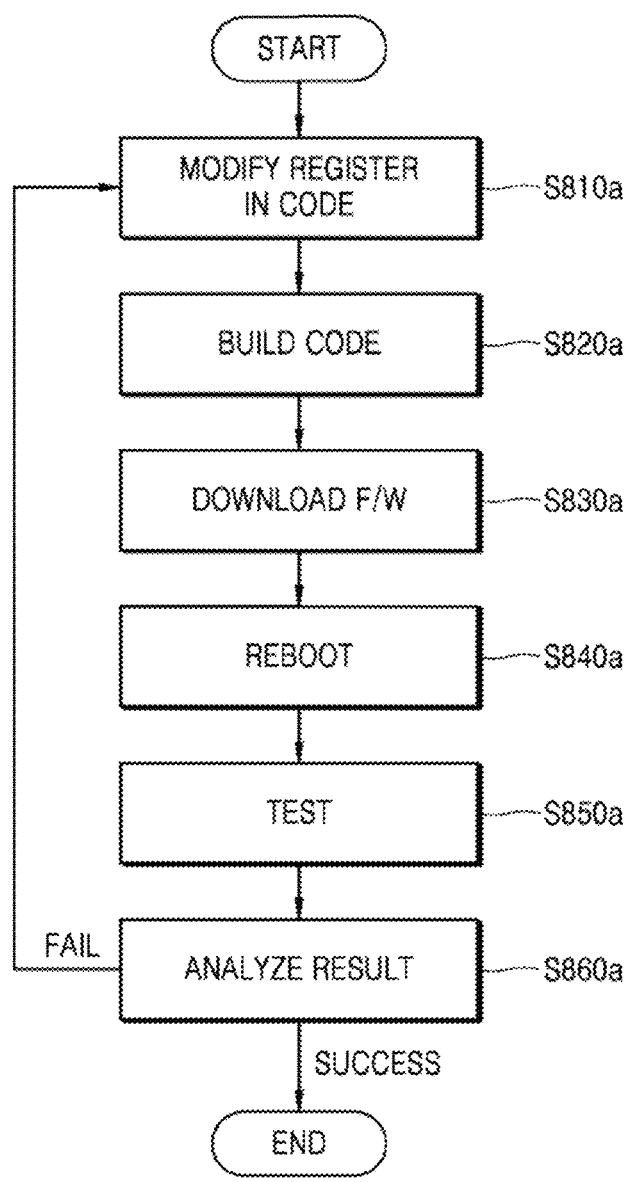
FIG. 8A is a flowchart illustrating a method of changing settings of an image sensor, according to a comparative embodiment.
Figure 8B:
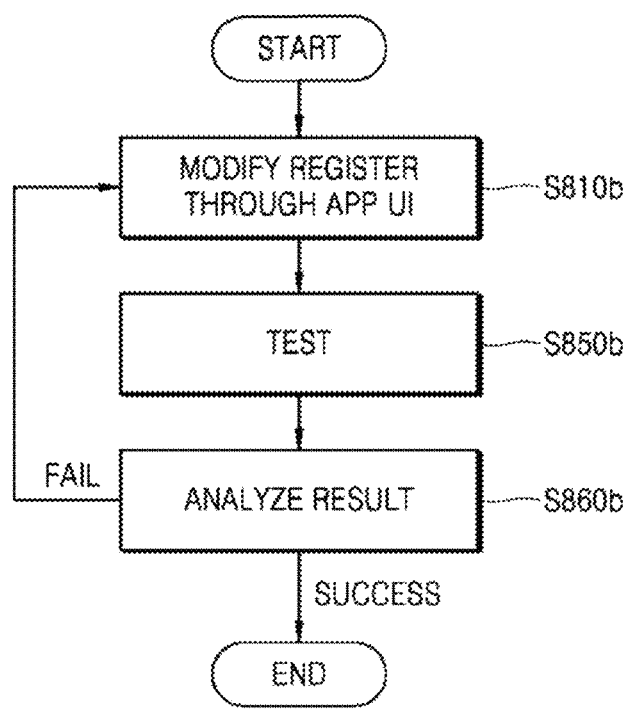
FIG. 8B is a flowchart illustrating a method of changing settings of an image sensor, according to some example embodiments.

FIG. 8A is a flowchart illustrating a method of changing settings of an image sensor, according to a comparative embodiment, and FIG. 8B is a flowchart illustrating a method of changing settings of an image sensor, according to some example embodiments.

As shown in FIG. 8A, the method of changing settings of an image sensor, according to a comparative embodiment, includes modifying register setting values in code (e.g., register code) in operation S810a, building the code in operation S820a, downloading firmware after the build in operation S830a, rebooting the image processing system in operation S840a, testing the register setting values in operation S850a, analyzing a result of the test in operation S860a, and modifying the register setting values in operation S810a if the test is determined to be failed in operation S860a.

As shown in FIG. 8B, the method of changing settings of an image sensor, according to some example embodiments, includes modifying register setting values through an application user interface in operation S810b, testing the register setting values in operation S850b, analyzing a result of the test in operation S860b, and modifying the register setting values in operation S810b if the test is determined to be failed in operation S860b.

Referring to FIGS. 8A and 8B, since the method of changing the setting of the image sensor according to the comparative embodiment needs to modify the register setting values in the register course, the method includes building the code in operation S820a, downloading the firmware after the build in operation S830a, and rebooting the image processing system in operation S840a.

A method for changing settings of an image sensor according to some example embodiments is an implementation example of the method of the image processing system described above with reference to FIGS. 1 to 7, and it is possible to receive a change setting value from a user without needing to modify register codes in the image processing system (e.g., based at least in part on hooking a call command to another call command as described herein), and to test using the change setting value. Accordingly, the processes of code building, firmware download, and image processing system rebooting may be omitted, and according to the inventive concepts, it is possible to reduce the time taken to perform a method of changing settings of an image sensor, and thus the functionality of the image sensor and/or an image processing system including same may be improved based on the improved operating speed, responsiveness, capability to customize generated image data according to user input, and the like.

Figure 9:
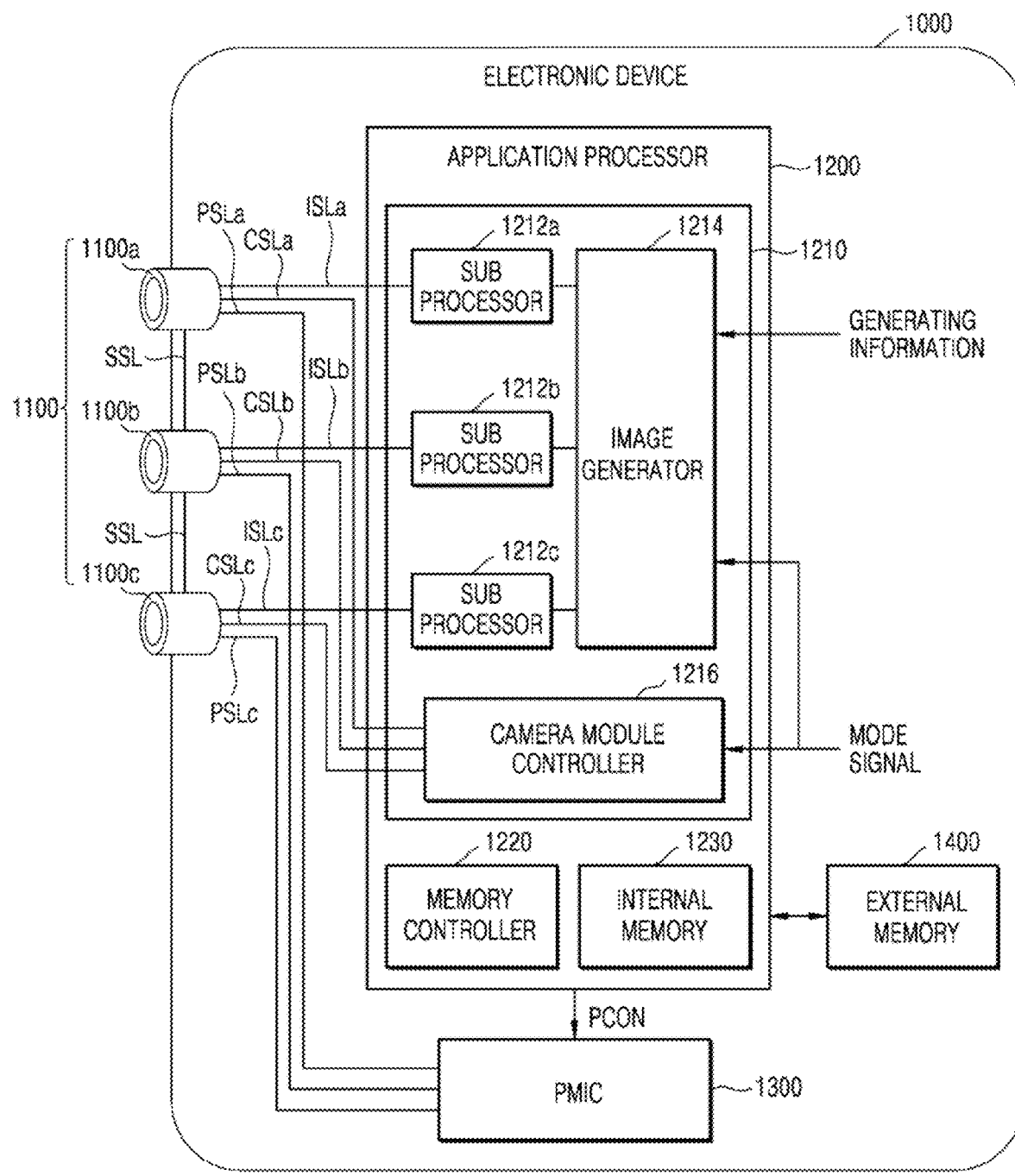
FIG. 9 is a block diagram of an electronic device including a multi-camera module.

FIG. 9 is a block diagram of an electronic device including a multi-camera module.

Referring to FIG. 9, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although the drawing shows some example embodiments in which three camera modules 1100a, 1100b, and 1100c are included, the example embodiments are not limited thereto. In some example embodiments, the camera module group 1100 may include only two camera modules or may be modified to include n (n is a natural number of 4 or more) camera modules.

The application processor 1200 may include an image processing device 1210, a memory controller 1220, and an internal memory 1230. The application processor 1200 may be implemented separately from the plurality of camera modules 1100a, 1100b, and 1100c, for example, as a separate semiconductor chip.

The image processing device 1210 may include a plurality of sub image processors 1212a, 1212b, and 1212c, an image generator 1214, and a camera module controller 1216.

The image processing device 1210 may include a plurality of sub image processors 1212a, 1212b, and 1212c corresponding to the number of camera modules, that is, the camera modules 1100a, 1100b, and 1100c.

In some example embodiments, the image processing device 1210 may include the platform described above with reference to FIGS. 1 to 7. The image processing device 1210 including a platform may receive, from a user, first setting data including change setting values of a plurality of image sensors included in the plurality of camera modules 1100a, 1100b, and 1100c, and based on the first setting data, the image processing device 1210 may hook a first call command for calling a first operation setting command including an initial setting value into a second call command for calling a second operation setting command including a change setting value. By hooking the first call command to the second call command, the image processing device 1210 may change setting values of a plurality of image sensors included in the plurality of camera modules 1100a, 1100b, and 1100c without modifying the register code, according to the setting data entered by the user, and thus the functionality of the image sensor and/or an image processing system including same may be improved based on the improved operating speed, responsiveness to user input, capability to customize generated image data according to user input, and the like.

The image data generated from the camera module 1100a may be provided to the sub image processor 1212a through an image signal line ISLa, image data generated from the camera module 1100b may be provided to the sub image processor 1212b through an image signal line ISLb, and image data generated by the camera module 1100c may be provided to the sub image processor 1212c through an image signal line ISL. Such image data transmission may be performed using, for example, a Camera Serial Interface (CSI) based on a Mobile Industry Processor Interface (MIPI), but embodiments are not limited thereto.

In some example embodiments, one sub image processor may be arranged to correspond to a plurality of camera modules. For example, the sub image processor 1212a and the sub image processor 1212c are not implemented separately from each other as shown, but integrated into one sub image processor, and image data provided from the camera modules 1100a and 1100c may be selected through a selection element (e.g., a multiplexer) and then provided to the integrated sub image processor. In this case, the sub image processor 1212b is not integrated and may receive image data from the camera module 1100b.

In addition, in some example embodiments, the image data generated from the camera module 1100a may be provided to the sub image processor 1212a through the image signal line ISLa, image data generated from the camera module 1100b may be provided to the sub image processor 1212b through the image signal line ISLb, and image data generated by the camera module 1100c may be provided to the sub image processor 1212c through the image signal line ISLc. In addition, the image data processed by the sub image processor 1212b is directly provided to the image generator 1214, but any one of the image data processed by the sub image processor 1212a and the image data processed by the sub image processor 1212c may be selected through a selection element (e.g., a multiplexer), and then may be provided to the image generator 1214.

Each of the sub image processors 1212a, 1212b, and 1212c may perform image processing, such as bad pixel correction, 3A adjustment (Auto-focus correction, Auto-white balance, Auto-exposure, etc.), noise reduction, sharpening, gamma control, remosaic processing, and the like, on image data provided from the camera modules 1100a, 1100b, and 1100c.

In some example embodiments, remosaic signal processing may be performed in each of the camera modules 1100a, 1100b, and 1100c and then the result of remosaic signal processing may be provided to the sub image processors 1212a, 1212b, and 1212c.

Image data processed by each of the sub image processors 1212a, 1212b, and 1212c may be provided to the image generator 1214. The image generator 1214 may generate an output image using image data provided from each of the sub image processors 1212a, 1212b, and 1212c according to image generating information or a mode signal.

Specifically, the image generator 1214 may generate an output image by merging at least some of the image data generated by the sub image processors 1212a, 1212b, and 1212c according to image generation information or a mode signal. Also, the image generator 1214 may generate an output image by selecting one of image data generated by the sub image processors 1212a, 1212b, and 1212c according to image generation information or a mode signal.

In some example embodiments, the image creation information may include a zoom signal or zoom factor. Also, in some example embodiments, the mode signal may be a signal based on a mode selected by a user, for example.

When the image generation information is a zoom signal (zoom factor) and each of the camera modules 1100a, 1100b, and 1100c has different fields of view (viewing angles), the image generator 1214 may perform different operations according to the type of zoom signal. For example, when the zoom signal is a first signal, among the image data output from the sub image processor 1212a and the image data output from the sub image processor 1212c, an output image may be generated using image data output from the sub image processor 1212a and image data output from the sub image processor 1212b. If the zoom signal is a second signal different from the first signal, among the image data output from the sub image processor 1212a and the image data output from the sub image processor 1212c, the image generator 1214 may generate an output image using image data output from the sub image processor 1212c and image data output from the sub image processor 1212b. If the zoom signal is a third signal different from the first and second signals, the image generator 1214 may generate an output image by selecting any one of image data output from each of the sub image processors 1212a, 1212b, and 1212c without merging the image data. However, the example embodiments are not limited thereto, and a method of processing image data may be modified and implemented as needed.

Figure 10:
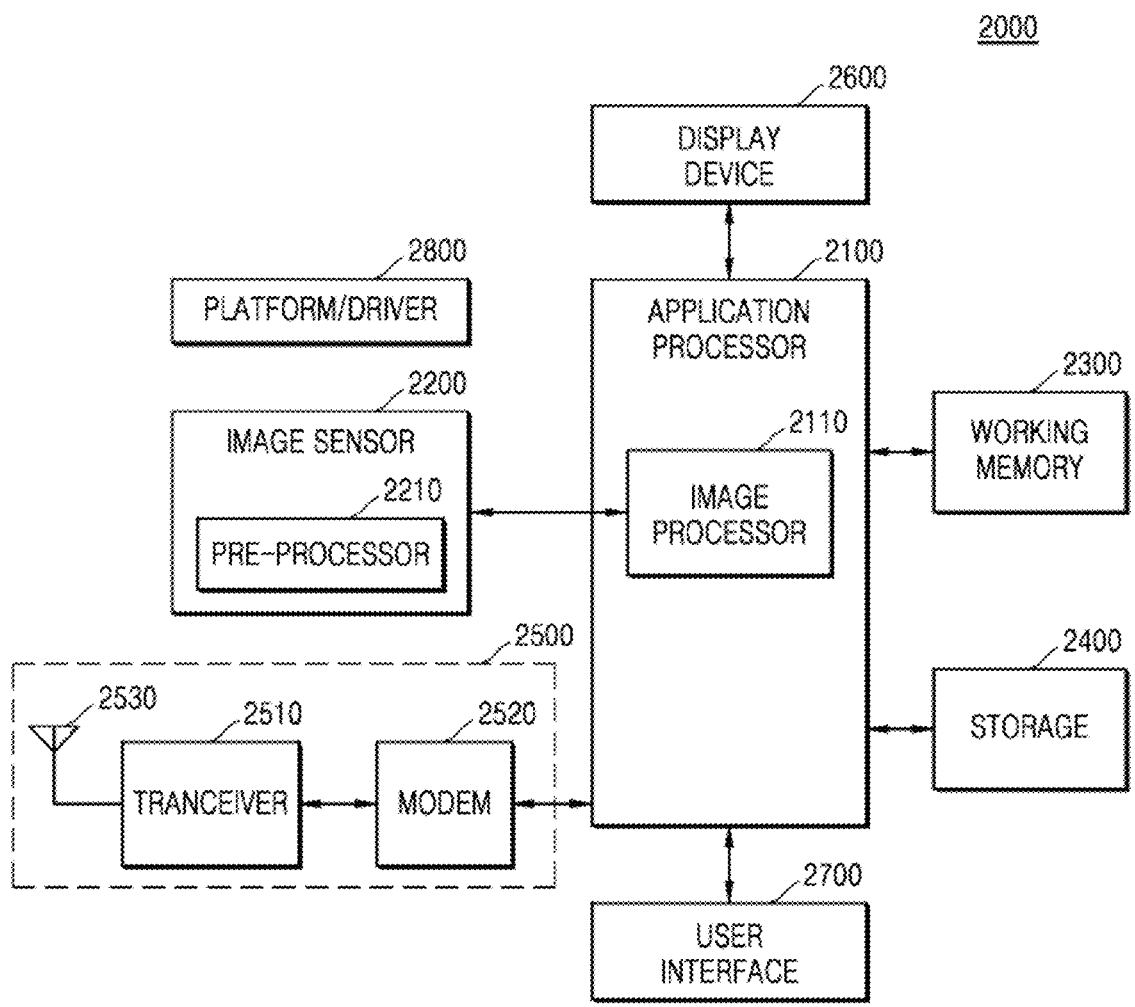
FIG. 10 is a block diagram illustrating an image processing system according to some example embodiments.

FIG. 10 is a block diagram illustrating an image processing system according to some example embodiments. An image processing system 2000 of FIG. 10 may be a portable terminal.

Referring to FIG. 10, the image processing system 2000 includes an application processor 2100, an image sensor 2200, a display device 2600, a working memory 2300, a storage 2400, a user interface 2700, a wireless transmission/reception unit 2500, and a platform and driver 2800.

The application processor 2100 controls all operations of the image processing system 2000 and may be implemented as a system-on-chip (SoC) that drives application programs and an OS. The application processor 2100 may provide image data provided from the image sensor 2200 to the display device 2600 or store the image data in the storage 2400. The application processor 2100 may include an image processor 2110. The image processor 2110 may perform image processing, such as image quality adjustment and data format change, on image data received from the image sensor 2200.

The working memory 2300 may be implemented with a volatile memory, such as dynamic random access memory (DRAM), static RAM (SRMA), and the like, or a non-volatile resistive memory, such as ferroelectric RAM (Fe-RAM), Resistive RAM (RRAM), Phase-change RAM (PRAM), and the like. The working memory 2300 may store programs and/or data processed or executed by the application processor 2100.

The storage 2400 may be implemented as a nonvolatile memory device, such as NAND flash, resistive memory, and the like, and for example, the storage 2400 may be provided as a memory card (e.g., a MultiMediaCard (MMC), an embedded MMC (eMMC), a secure digital (SD) card, and a micro SD card), and the like. The storage 2400 may store image data provided from the image sensor 2200.

The user interface 2700 may be implemented with various devices capable of receiving user input, such as a keyboard, a curtain key panel, a touch panel, a fingerprint sensor, and a microphone. The user interface 2700 may receive a user input and provide a signal corresponding to the received user input to the application processor 2100.

The wireless transmission/reception unit 2500 may include a transceiver 2510, a modem 2520, and an antenna 2530.

The platform and driver 2800 is a part of the image processing system described with reference to FIGS. 1 to 7 and may receive setting data from the user interface 2700 and change a setting value of the image sensor 2200. Specifically, the user interface 2700 generates a setting change command corresponding to the setting data, and the platform and driver 2800 may hook a first call command for calling (e.g., associated with calling) a first operation setting command including an initial setting value into a second call command for calling (e.g., associated with calling) a second operation setting command including a change setting value based on the setting change command. By hooking the first call command to the second call command, it is possible to change the setting value of the image sensor 2200 according to the setting data input by the user without modifying the register code, and thus the functionality of the image sensor and/or an image processing system including same may be improved based on the improved operating speed, responsiveness to user input, capability to customize generated image data according to user input, and the like.

As described herein, any devices, systems, modules, portions, units, controllers, circuits, and/or portions thereof according to any of the example embodiments, and/or any portions thereof (including, without limitation, the image processing system 10, the user interface 110, the platform 200, the driver 300, the image sensor 400, the image processing system 10a, the camera application 100, the user interface 110a, the platform 200a, the API 210, the HAL 220, the control interface 221, the driver 300a, the first region 310, the second region 320, the image sensor 400a, the AP 500, the user interface 110b, the platform 200b, the driver 300b, the image sensor 400b, the user interface 110c, the platform 200c, the driver 300c, the image sensor 400c, the user interface 110d, the platform 200d, the driver 300d, the image sensor 400d, the electronic device 1000, the application processor 1200, the image processing device 1210, the camera module group 1100, the camera modules 1100a to 1100c, the sub image processors 1212a to 1212c, the image generator 1214, the camera module controller 1216, the memory controller 1220, the internal memory 1230, the PMIC 1300, the external memory 1400, the image processing system 2000, the application processor 2100, the image processor 2110, the image sensor 2200, the preprocessor 2210, the working memory 2300, the storage 2400, the wireless transmission/reception unit 2500, transceiver 2510, the modem 2520, the display device 2600, the user interface 2700, the platform and driver 2800, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, portions, units, controllers, circuits, and/or portions thereof according to any of the example embodiments.

Any of the memories described herein may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM).

While the inventive concepts have been particularly shown and described with reference to some example embodiments thereof, it will be understood that various changes in form and details may be made therein without departing from the spirit and scope of the following claims.

What is claimed is:

1. An image processing system, comprising:
 a user interface configured to receive first setting data from a user and transmit a setting change command corresponding to the first setting data;
 a platform configured to hook a first call command into a second call command in response to receiving the setting change command corresponding to the first setting data; and
 a driver configured to transmit, to an image sensor, one of
  a first operation setting command corresponding to the first call command, or
  a second operation setting command corresponding to the second call command, the second call command associated with changing a setting value of the image sensor, the second operation setting command associated with setting the setting value of the image sensor based on the first setting data, wherein the driver is further configured to, in response to receiving the second call command, transmit the second operation setting command to the image sensor.

2. The image processing system of claim 1, wherein
 the first setting data comprises a change setting value of the image sensor,
 the driver comprises a plurality of register codes including an initial setting value of the image sensor,
 the first operation setting command is associated with setting the setting value of the image sensor to the initial setting value, and
 the driver is configured to transmit the first operation setting command associated with setting the setting value of the image sensor to the initial setting value in response to receiving the first call command, and the driver is configured to transmit the second operation setting command associated with setting the setting value of the image sensor to the change setting value is transmitted in response to receiving the second call command.

3. The image processing system of claim 2, wherein
 each register code of the plurality of register codes comprises an address and a key value,
 the change setting value comprises an address of a register code group, a change value corresponding to a key value of the register code group, and a range of the change value, and
 the register code group comprises at least one register code of the plurality of register codes.

4. The image processing system of claim 1, wherein the platform is configured to monitor the first call command and to hook the first call command into the second call command in real time.

5. The image processing system of claim 3, further comprising at least one processor,
 wherein the image sensor is configured to, in response to changing the setting value to the change setting value, generate pieces of image data based on the change setting value, and
 wherein the at least one processor is configured to generate a certain change value among the range of the change value using an arithmetic algorithm based on the pieces of image data.

6. The image processing system of claim 5, wherein the user interface is configured to
 receive third setting data generated based on second setting data from the user after transmitting the second setting data including the certain change value to the user, and
 transmit a setting change command corresponding to the third setting data.

7. The image processing system of claim 2, wherein
 each register code of the plurality of register codes comprises an address and a key value, and
 the change setting value comprises an address of a first register code included in the plurality of register codes and a change value corresponding to a key value of the first register code.

8. The image processing system of claim 2, wherein the platform is configured to transmit a command to block transmission of the first operation setting command to the driver in response to receiving the setting change command.

9. The image processing system of claim 1, wherein the platform comprises a control interface that is configured to receive the setting change command from the user interface and to hook the first call command into the second call command.

10. The image processing system of claim 9, wherein the driver comprises:
   a first region configured to store a plurality of register codes including initial setting values of the image sensor, and
   a second region configured to store at least one control code generated by the driver based on at least one register code of the plurality of register codes or the second call command, and
   the first operation setting command or the second operation setting command is generated based on the at least one control code.

11. The image processing system of claim 2, wherein the change setting value of the image sensor is a setting value corresponding to the plurality of register codes.

12. An operating method of an image processing system including an image sensor, the operating method comprising:
   receiving execution data from a user and setting a setting value of the image sensor as an initial setting value based on a first operation setting command;
   receiving setting data including a change setting value from the user and generating a setting change command corresponding to the setting data;
   hooking a first call command associated with calling the first operation setting command to a second call command based on the setting change command;
   generating a second operation setting command associated with changing the setting value of the image sensor to the change setting value based on the second call command; and
   changing the setting value of the image sensor to the change setting value based on the second operation setting command.

13. The operating method of claim 12, wherein
   the image processing system further comprises a plurality of register codes including the initial setting value,
   the change setting value comprises an address of a register code group, a change value corresponding to a key value of the register code group, and a range of the change value, and
   the register code group comprises at least one register code of the plurality of register codes.

14. The operating method of claim 13, wherein the changing of the setting value of the image sensor to the change setting value based on the second operation setting command further comprises:
   generating pieces of image data based on the change setting value;
   generating a certain change value among the range of the change value using an arithmetic algorithm based on the pieces of image data; and
   changing the setting value of the image sensor to the change setting value including the certain change value.

15. The operating method of claim 12, wherein
   the receiving of the execution data from the user and the setting of the setting value of the image sensor as the initial setting value based on the first operation setting command further comprises setting the setting value of the image sensor as an environment setting value based on a third operation setting command in response to a determination that a change in an external environment has occurred, and
   the hooking the first call command associated with calling the first operation setting command to the second call command based on the setting change command comprises:
      generating a command to block transmission of the third operation setting command, and
      hooking a third call command associated with calling the third operation setting command to the second call command.

16. The operating method of claim 15, wherein the change in the external environment comprises one of a change in illuminance of the external environment or a change in a subject located in the external environment.

17. A platform configured to change a setting of an image sensor, the platform comprising:
   an application programming interface (API) configured to connect a camera application associated with controlling the image sensor with the platform; and
   a hardware abstraction layer configured to connect the platform to a driver,
   wherein the hardware abstraction layer comprises a control interface, the control interface configured to
      generate a first call command associated with calling a command associated with setting a setting value of the image sensor as an initial setting value,
      generate a second call command associated with calling a command associated with setting the setting value of the image sensor as a change setting value, and
      receive a setting change command through a user interface included in the camera application and hook the first call command transmitted to the driver to the second call command transmitted to the driver based on the setting change command.

18. The platform of claim 17, wherein
   the driver comprises a plurality of register codes including the initial setting value,
   the change setting value comprises an address of a register code group, a change value corresponding to a key value of the register code group, and a range of the change value, and
   the register code group comprises at least one register code among the plurality of register codes.

19. The platform of claim 17, wherein
   the driver comprises a plurality of register codes including the initial setting value, and
   the change setting value comprises an address of a first register code among the plurality of register codes and a change value corresponding to a key value of the first register code.

20. The platform of claim 17, wherein the control interface is configured to, in response to receiving the setting change command, transmit, to the driver, a command to prevent setting the setting value to the initial setting value.

* * * * *